(12) United States Patent
Osamura

(10) Patent No.: US 11,475,217 B2
(45) Date of Patent: Oct. 18, 2022

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Toru Osamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 218 days.

(21) Appl. No.: 16/351,547

(22) Filed: Mar. 13, 2019

(65) Prior Publication Data

US 2019/0347330 A1 Nov. 14, 2019

(30) Foreign Application Priority Data

May 9, 2018 (JP) .............................. JP2018-090638

(51) Int. Cl.
*G06F 40/247* (2020.01)
*G06F 16/33* (2019.01)
*G10L 15/26* (2006.01)
*G10L 15/22* (2006.01)
*G06F 3/16* (2006.01)

(52) U.S. Cl.
CPC ............ *G06F 40/247* (2020.01); *G06F 3/167* (2013.01); *G06F 16/3344* (2019.01); *G10L 15/22* (2013.01); *G10L 15/26* (2013.01)

(58) Field of Classification Search
CPC ... G10L 15/22; G10L 15/26; G10L 2015/088; G06F 3/167
See application file for complete search history.

(56) References Cited

U.S. PATENT DOCUMENTS

| | | | | |
|---|---|---|---|---|
| 6,064,963 A | * | 5/2000 | Gainsboro | G10L 15/26 379/88.01 |
| 6,411,683 B1 | * | 6/2002 | Goldberg | H04M 3/2281 379/88.01 |
| 6,868,154 B1 | * | 3/2005 | Stuart | H04M 3/51 379/221.01 |
| 7,860,722 B1 | * | 12/2010 | Chow | H04M 3/2281 705/1.1 |
| 9,774,911 B1 | * | 9/2017 | Thomas | H04N 21/234 |
| 2004/0008828 A1 | * | 1/2004 | Coles | H04M 3/5183 379/88.01 |

(Continued)

FOREIGN PATENT DOCUMENTS

| | | |
|---|---|---|
| JP | H11242545 | 9/1999 |
| JP | 2002197252 | 7/2002 |
| JP | 2017102627 | 6/2017 |

OTHER PUBLICATIONS

"Office Action of Japan Counterpart Application", dated Feb. 15, 2022, with English translation thereof, p. 1-p. 8.

*Primary Examiner* — Samuel G Neway
(74) *Attorney, Agent, or Firm* — JCIPRNET

(57) ABSTRACT

An information processing apparatus includes a collecting unit that collects data from communication devices, a receiving unit that receives a selection condition, a selecting unit that selects a piece of data from the collected data based on the selection condition received by the receiving unit, and an output unit that outputs the selected piece of data to a subsequent processing unit.

6 Claims, 4 Drawing Sheets

(56) References Cited

U.S. PATENT DOCUMENTS

| | | | |
|---|---|---|---|
| 2005/0209868 A1* | 9/2005 | Wan | G06Q 10/0639 |
| | | | 705/345 |
| 2005/0283475 A1* | 12/2005 | Beranek | |
| 2007/0071206 A1* | 3/2007 | Gainsboro | G10L 25/63 |
| | | | 379/168 |
| 2008/0172359 A1* | 7/2008 | Lundell | G10L 15/22 |
| 2008/0276315 A1* | 11/2008 | Shuster | H04L 51/12 |
| | | | 726/22 |
| 2009/0131177 A1* | 5/2009 | Pearce | A63F 13/12 |
| | | | 463/43 |
| 2009/0209335 A1* | 8/2009 | Pearce | G06Q 50/01 |
| | | | 463/30 |
| 2009/0292526 A1* | 11/2009 | Harari | G06F 40/205 |
| | | | 704/9 |
| 2009/0327263 A1* | 12/2009 | Maghoul | G06F 16/3329 |
| 2010/0179811 A1* | 7/2010 | Gupta | G10L 15/22 |
| | | | 704/235 |
| 2010/0325107 A1* | 12/2010 | Kenton | G06Q 30/00 |
| | | | 707/723 |
| 2014/0241340 A1* | 8/2014 | Seligmann | H04M 9/003 |
| | | | 370/352 |
| 2019/0243642 A1* | 8/2019 | Bahrami | G06F 40/279 |
| 2019/0347330 A1* | 11/2019 | Osamura | G06F 16/3344 |
| 2020/0013389 A1* | 1/2020 | Ukai | G06F 40/10 |
| 2020/0027454 A1* | 1/2020 | Li | G10L 15/22 |

* cited by examiner

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2018-090638 filed May 9, 2018.

BACKGROUND

(i) Technical Field

The present invention relates to an information processing apparatus and a non-transitory computer readable medium storing an information processing program.

(ii) Related Art

On an IoT network in which data information of an IoT device using a near field wireless communication technology is transmitted to a server via a device such as a mobile phone terminal, a wireless gateway, or the like by connecting to the internet, JP2017-102627A discloses an IoT information communication system in which a data relay device such as the mobile phone terminal, the wireless gateway, or the like relays all pieces of data received from the IoT device by a software gateway included in the data relay device to the server on the internet.

SUMMARY

In some cases, the data collected by the IoT device may include sensing data and the like and the amount of data may be enormous. In addition, there are various types of IoT devices to be disposed in the system and the number of IoT devices also may be enormous. In the related art, the data is often collected according to a purpose, but since the data can be collected at low cost recently, the data is first collected and extracted as necessary later, that is, big data thinking is not uncommon.

However, it takes considerable cost to transmit an enormous amount of data to the internet without a delay. For this reason, in a case where the purpose of the data is known, the transmission data may be appropriately reduced so as to reduce communication cost.

Aspects of non-limiting embodiments of the present disclosure relate to an information processing apparatus and a non-transitory computer readable medium storing an information processing program capable of reducing data collected by a communication device and outputting the resultant data to a subsequent processing unit.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a collecting unit that collects data from communication devices; a receiving unit that receives a selection condition; a selecting unit that selects a piece of data from the collected data based on the selection condition received by the receiving unit; and an output unit that outputs the selected piece of data to a subsequent processing unit.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described with reference to the accompanying drawings.

Figure 1:
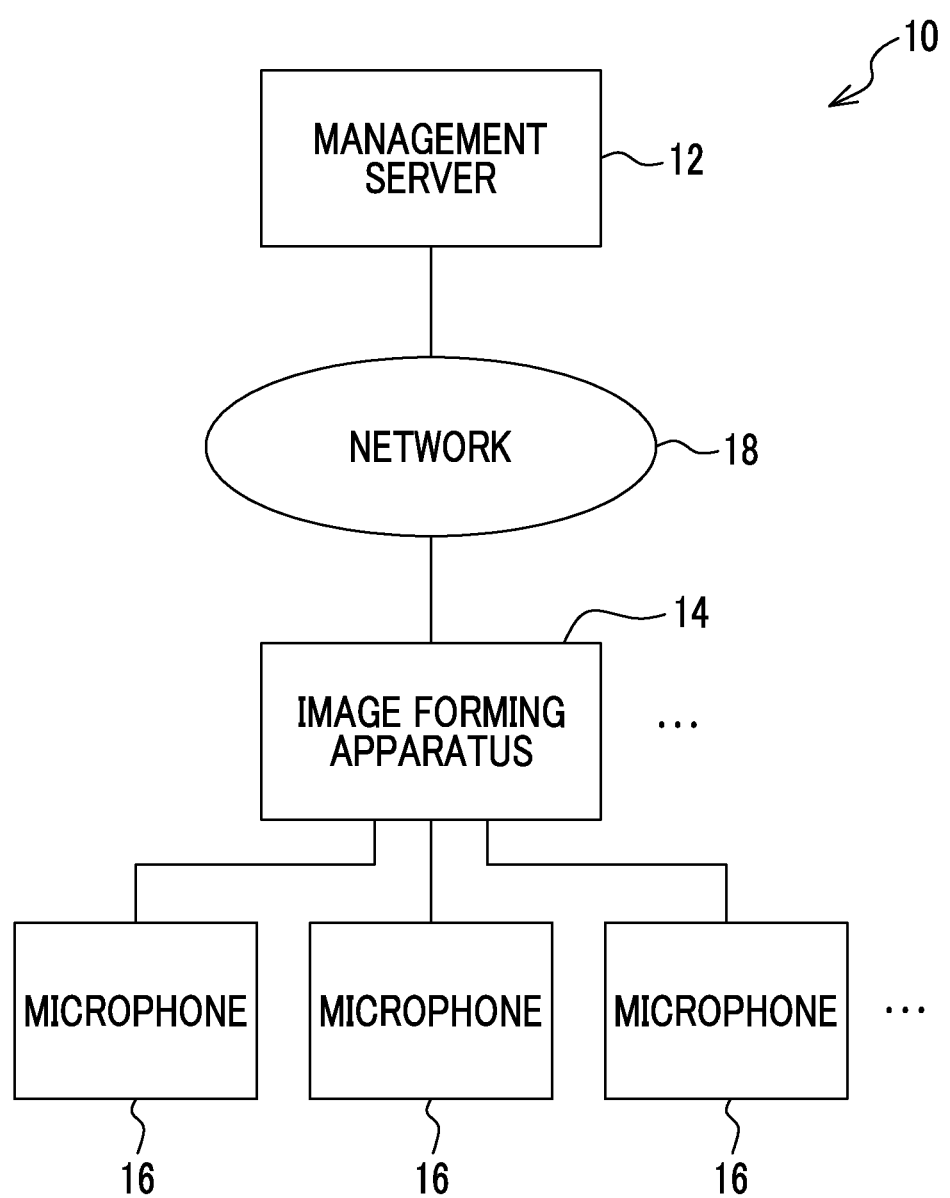
FIG. 1 is a configuration diagram of an information processing system.

FIG. 1 is a diagram illustrating a schematic configuration of an information processing system 10 according to the present exemplary embodiment.

As illustrated in FIG. 1, the information processing system 10 is configured to include a management server 12 and a plurality of image forming apparatuses 14 being wired or wirelessly connected via a network 18 such as the Internet. A plurality of microphones are connected to the image forming apparatus 14 in a wired manner or wireless manner. The image forming apparatus 14 is an example of an information processing apparatus. In addition, a microphone 16 is an example of a communication device and an example of an audio input device which inputs a voice.

In the present exemplary embodiment, the image forming apparatus 14 has a function as an edge device which transmits audio data collected by the microphone 16 to the management server 12, that is, a relay device. The management server 12 has a function as an analyzing device which analyzes the audio data transmitted from the image forming apparatus 14 and extracts necessary information.

Next, a configuration of the image forming apparatus 14 will be described.

Figure 2:
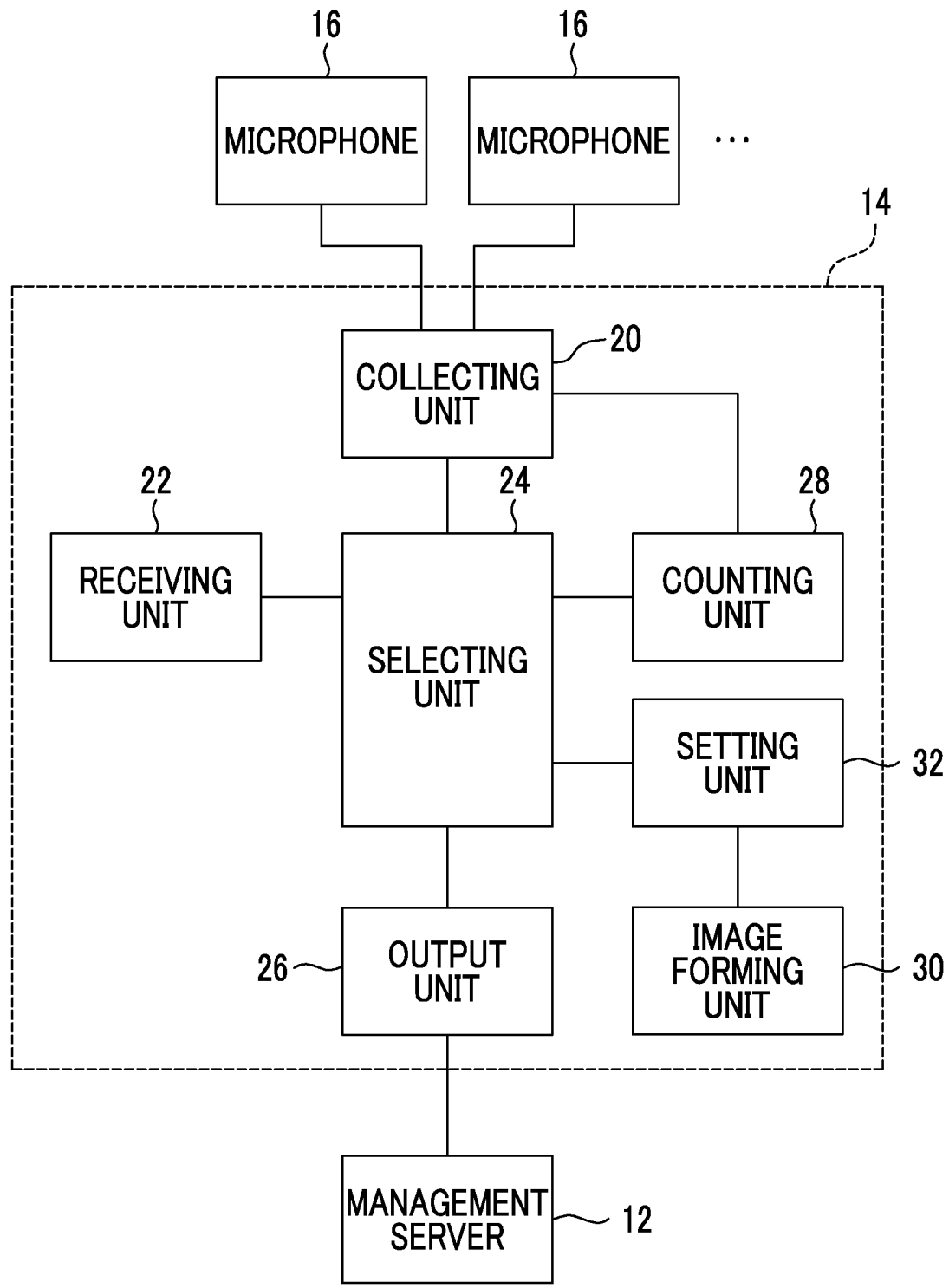
FIG. 2 is a functional block diagram of an image forming apparatus.

As illustrated in FIG. 2, the image forming apparatus 14 functionally includes a collecting unit 20, a receiving unit 22, a selecting unit 24, an output unit 26, a counting unit 28, an image forming unit 30, and a setting unit 32.

The collecting unit 20 collects data from the plurality of microphones 16. Specifically, the collecting unit 20 collects the audio data of the audio input to the microphone 16.

The receiving unit 22 receives a selection condition of the audio data collected by the collecting unit 20. Specifically, for example, the receiving unit 22 receives a keyword as a selection condition.

The selecting unit 24 selects a piece of audio data from the audio data collected by the collecting unit 20 under the selection condition received by the receiving unit 22. Specifically, the selecting unit 24 selects, as an example, the piece of audio data based on the keyword received by the receiving unit 22.

The output unit 26 outputs the piece of audio data selected by the selecting unit 24 to the management server 12. The management server 12 is an example of a subsequent processing unit.

The counting unit 28 counts how many times the keyword appears in the collected audio data. The selecting unit 24 selects the piece of audio data from the collected audio data based on a keyword whose number of appearances in the collected audio data is equal to or larger than a predetermined threshold value.

The image forming unit 30 is a functional unit which forms an image on a recording medium such as a paper sheet by electrophotographic method, ink jet method, or the like.

The setting unit 32 sets the keyword corresponding to an operating state of the image forming unit. In this case, the selecting unit 24 selects the piece of data from the collected data based on the keyword set by the setting unit 32.

Figure 3:
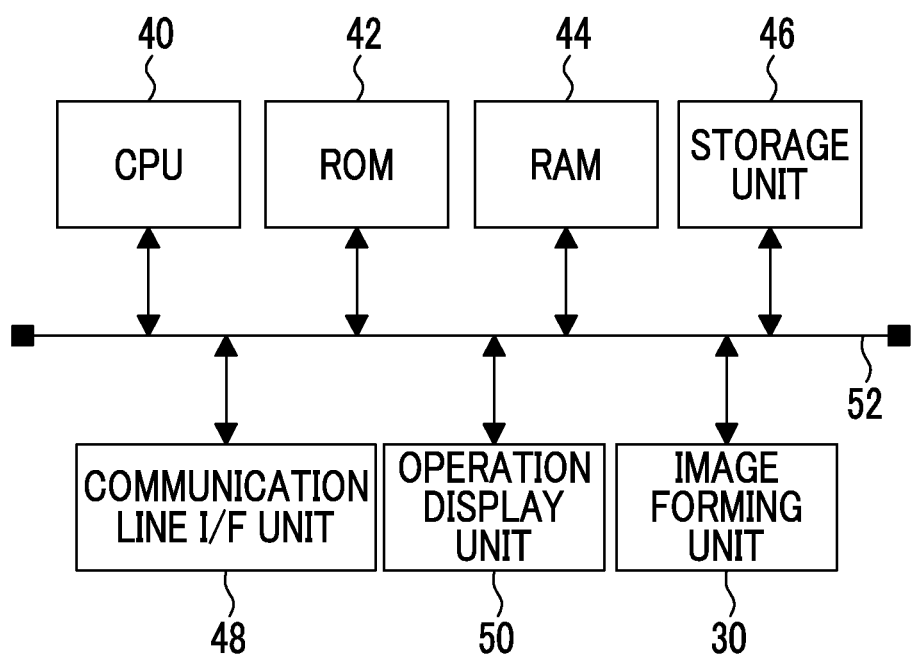
FIG. 3 is a block diagram illustrating an electrical configuration of the image forming apparatus.

FIG. 3 is a block diagram illustrating a hardware configuration of the image forming apparatus 14.

As illustrated in FIG. 3, the image forming apparatus 14 includes a central processing unit (CPU) 40 which controls an overall operation of the image forming apparatus 14 and a read only memory (ROM) 42 in which various programs, various parameters, and the like are stored in advance. In addition, the image forming apparatus 14 includes a random access memory (RAM) 44 used as a work area or the like when the CPU 40 executes various programs and a nonvolatile storage unit 46 such as a flash memory or the lie.

Further, the image forming apparatus 14 includes a communication line interface (I/F) unit 48 which transmits and receives communication data with an external device. In addition, the image forming apparatus 14 includes an operation display unit 50 which receives an instruction from a user and displays various information on an operation state or the like of the image forming apparatus 14 to the user. The operation display unit 50 includes, for example, a display button for realizing reception of an operation instruction by execution of a program, a display provided with a touch panel on a display surface on which various information is displayed, and a hardware key such as a ten key, a start button, or the like.

The CPU 40, the ROM 42, the RAM 44, the storage unit 46, the communication line I/F unit 48, the operation display unit 50, and the image forming unit 30 are mutually connected via a bus 52 such as an address bus, a data bus, a control bus, or the like.

With this configuration, the image forming apparatus 14 according to the exemplary embodiment causes the CPU 40 to access to the ROM 42, the RAM 44, and the storage unit 46, to transmit and receive the communication data between the management server 12 and the microphone 16 via the communication line I/F unit 48, and to control the image forming unit 30. In addition, the image forming apparatus 14 respectively causes the CPU 40 to obtain various instruction information via the operation display unit 50 and to display various information on the operation display unit 50.

In the present exemplary embodiment, the image forming apparatus 14 has a function as an edge device which transmits audio data collected by the microphone 16 to the management server 12, that is, a relay device. The management server 12 analyzes the audio data transmitted from the image forming apparatus 14 and extracts necessary information.

Figure 4:
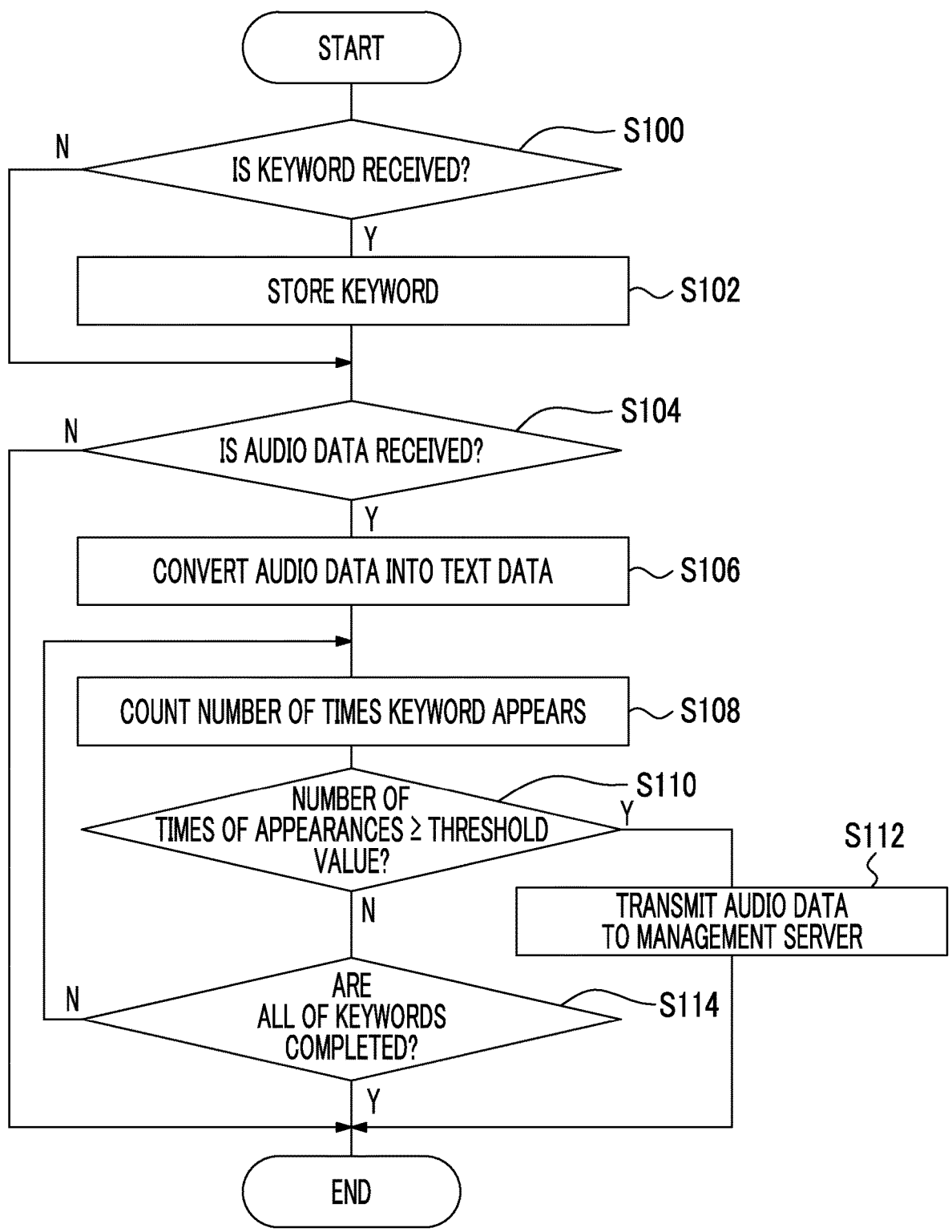
FIG. 4 is a flowchart illustrating a flow of an information process executed by the image forming apparatus.

Next, a flow of an information process executed by the image forming apparatus 14 will be described with reference to a flowchart illustrated in FIG. 4. The information process illustrated in FIG. 4 is repeatedly executed.

In step S100, it is determined whether or not the keyword (an example of the selection condition) is received. As described above, the image forming apparatus 14 has a function as an edge device which transmits the audio data collected by the microphone 16 to the management server 12, but in a case where all pieces of the collected audio data are transmitted to the management server 12, a transmission load becomes heavy. In addition, also in the management server 12, in a case of analyzing all pieces of the enormous audio data, a processing load becomes heavy. For this reason, an administrator or the user of the image forming apparatus 14 operates the operation display unit 50 to input the keyword for selecting a piece of audio data from the collected audio data. Here, for example, the keyword corresponding to the purpose of analysis is preferably input so that information corresponding to the purpose of the analysis is obtained in a case where the management server 12 analyzes the audio data.

In a case where a keyword is received in step S100, the routine moves to step S102, and in a case where no keyword is received, the routine moves to step S104.

In step S102, the keyword received in step S100 is registered in the storage unit 46.

In step S104, it is determined whether or not audio data is received from the microphone 16. In a case of receiving audio data, the routine moves to step S106 and in a case of not receiving audio data, the present routine is terminated.

In step S106, the audio data received in step S104 is converted into text data by using a known conversion method such as speech-to-text.

In step S108, the number of times the keyword registered in the storage unit 46 appears in the text data obtained in step S106 is counted.

In step S110, it is determined whether or not the number of appearances counted in step S108 is equal to or larger than the predetermined threshold value. Here, the threshold value is set so that in a case where the number of times the keyword appears is equal to or larger than the threshold value, the number of times is valid for analyzing the audio data by the management server 12. For example, the threshold value is set based on a result of an actual machine test for obtaining a relationship between an analysis result of the audio data and the number of times the keyword appears and the like.

In a case where the number of times of appearances counted in step S108 is equal to or larger than the predetermined threshold value, the routine moves to step S112, in a case where the number of times of appearances counted in step S108 is smaller than the predetermined threshold value, the routine moves to step S114.

In step S112, the audio data received in step S104 is transmitted to the management server 12. The text data obtained in step S106 may be transmitted to the management server 12 along with the audio data or only the text data may be transmitted to the management server 12.

In step S114, it is determined whether or not the number of times the keyword appears is counted for all of the keywords registered in the storage unit 46. Thereafter, in a case where the number of times the keyword appears is counted for all of the keywords registered in the storage unit 46, the routine is terminated. On the other hand, in a case where the keyword of which the number of times of appearances is not counted exists, the routine returns to step S108 and the process described above is repeated.

As described above, in the present exemplary embodiment, not all pieces of the audio data collected by the microphone 16 are transmitted to the management server 12, but only selected pieces are transmitted. The pieces are selected based on a keyword whose number of appearances in the collected data is equal to or larger than a threshold.

In the present exemplary embodiment, the audio data in the case where the number of times the keyword appears is equal to or larger than the threshold value is transmitted to the management server 12, but the processes in step S108 and step S110 may be omitted. That is, in a case where the keyword is included in the audio data, the audio data may be transmitted to the management server 12 regardless of the number of times the keyword appears.

Next, a specific use of the information processing system 10 will be described. First, a case where contents of analysis of the audio data are known in advance in the management server 12 will be described.

In this example case, the image forming apparatus 14 is installed in an office, a conversation in the office is collected as audio data by the microphone 16 and transmitted to the management server 12 via the image forming apparatus 14. Here, in a case where there are many cases where paper documents are used for storing or sharing data used in the office, the paper documents may be scanned, and stored and shared as electronic documents to improve the case. In this case, the management server 12 analyzes a current status and a request for handling the paper document from the audio data of the conversation in the office.

In this case, words and phrases representing a current problem of the office or a desired change to the office may be set as keywords. For example, "file", "filing", "binder", "folder", "cabinet", "scan", "server", "working folder", "paperless", or the like may be set. A keyword is not limited to a word, and may be a bigger chunk such as a phrase or a sentence.

In addition, in some cases, a synonym regarded as synonymous may exist for each of the keywords. In the case of registering the keyword in the storage unit 46 in step S102, along with the keyword, a synonym synonymous with the keyword may be stored in correspondence with the keyword. For example, the synonym may be obtained by searching synonym dictionary data stored in the storage unit 46 in advance or by accessing an external server (not illustrated), the synonym synonymous with the keyword may be obtained.

For example, in a case where a wording of "file" is received as a keyword in step S100, wordings of "filing", "binder", "folder", and the like are extracted from the synonym dictionary data as synonyms regarded as synonymous with "file" and registered in the storage unit 46 along with "file". In this case, in step S108, not only the number of times the keyword appears but also the number of times the synonym appears is counted. In step S110, it is determined whether or not a total number of appearances of the keyword and the synonym is equal to or larger than a threshold value.

In addition, among the synonyms extracted from the synonym dictionary data, priorities may be set to the synonyms in descending order of the numbers of times of appearances, including past audio data and the synonyms up to a predetermined order of the priority may be registered in the storage unit 46. The priority order may be updated every time the audio data is received.

In addition, the keyword corresponding to the operating state of the image forming unit 30 may be set and the pieces of audio data may be selected based on the set keyword. For example, in a case where the number of printed sheets of paper by the image forming unit 30 is large, it is assumed that management of the paper is difficult. In this case, the keyword such as "the number of printed sheets is large" or the like may be set.

Next, a case where a purpose of analysis of the audio data is known in the management server 12 will be described.

In this example case, a manager is comparing and deciding between two approaches to reduce personnel expenses in the office: (1) improve work efficiency and (2) reduce work. The manager may directly ask his/her members what they think, but they may not provide honest opinions. In such case, the manager may want to use the management server 12 to extract information from audio data of conversations in the office to make a better decision.

For example, keywords corresponding to the two approaches are respectively set, and the counting unit 28 counts the number of times these keywords appear in the audio data collected by the collecting unit over a certain period. The pieces of audio data to be transmitted to the management server 12 may be selected based on which approach has more counts.

For example, "not in time", "must be released next week", "can't generate test environment right now", and the like may be set as the keywords. If these keywords frequently appear in the conversations, it may be assumed that the first approach is not very reasonable. Here, in a case where the number of times these keywords appear in the conversations is equal to or larger than the threshold value, the selection based on the keywords corresponding to the first approach may not be performed and only the pieces of audio data selected based on the keywords corresponding to the second approach may be transmitted to the management server 12.

In addition, an opposite keyword representing an opposite meaning of the keyword may be registered. For example, the opposite keyword such as "in time", "no problem", or the like representing an opposite meaning of "not in time" described above may be registered. Further, the opposite keyword such as "release in next week, it's okay" or the like representing an opposite meaning of "must be released next week" or the opposite keyword such as "test is possible right now" or the like representing an opposite meaning of "can't generate test environment right now" may be registered. In this case, in a case where the number of times the keyword appears is larger than the number of times the opposite keyword appears, the selection may be performed based on the opposite keyword. In a case where a speaker of the audio data is specified, the selection may be performed in consideration of other information of the speaker such as his/her work contents, the amount of his/her overtime hours, and the like.

In addition, not only the number of times the keyword appears but also volume of the audio data may be obtained, and the audio data may be selected in consideration of the obtained volume.

Further, in a case where a smart speaker is connected to the image forming apparatus 14, for example, the smart speaker receives an instruction to purchase a paper sheet by voice in a case of out of paper sheet, the smart speaker may instruct a mail-order site to purchase the paper sheet via the network 18. In a case where a wording for instructing to purchase the paper sheet is included in the audio data collected by the microphone 16, the image forming apparatus 14 may output the audio data to the smart speaker so as to delegate the process. Accordingly, even in a case where the audio for instructing to purchase the paper sheet is not collected by the smart speaker for some reason, the paper sheet is purchased by transmitting the audio data collected by the microphone 16 to the smart speaker.

Further, in order to collect the clear audio by the microphone 16, a position of the microphone 16 may be notified. For example, as an example of the communication device, an audio output device which outputs the audio data may be connected to the image forming apparatus 14 and may instruct a speaker to output the audio data for notifying that the microphone 16 exists. Specifically, in a case where the microphone 16 is installed in a conference room, a start timing of the conference is detected in conjunction with a conference reservation system or based on a detection result of a human sensor which detects a person. In a case of detecting the start timing of the conference, the audio data such as "speak in a loud voice, please" may be output from the speaker.

In addition, for example, the management server 12 may instruct the image forming apparatus 14 to register the keyword for collecting necessary information based on an analysis result of the audio data.

Further, in a case where a plurality of the image forming apparatuses 14 exist, the management server 12 may allow the keywords for instructing registration to be distributed to the plurality of the image forming apparatuses 14.

In addition, the management server 12 may instruct the image forming apparatus 14 to change a type of the data to be collected, stop collecting the data, and the like based on the analysis result.

Although the present exemplary embodiment is described, the present invention is not limited to the scope described in the exemplary embodiment. Various modifications or improvements can be added to the exemplary embodiment without departing from the gist of the present invention and the modified or improved form is also included in the technical scope of the present invention.

For example, in the present exemplary embodiment, the audio data is selected based on the keyword, but the exemplary embodiment is not limited thereto. The audio data may be selected based on a type of the communication device, for example, only the data collected by a specific communication device is transmitted to the management server 12.

In addition, in the present exemplary embodiment, the case where the management server 12 has an independent configuration is described, but the image forming apparatus 14 may have a function of the management server 12.

In the present exemplary embodiment, the case where the microphone 16 is used as an example of the communication device is described, but the exemplary embodiment is not limited thereto. A wearable terminal, a camera, a smartphone, an IC card with a near field wireless communication function, or the like may be used.

In addition, in the present exemplary embodiment, a form in which an information processing program is installed in the storage unit 46 is described, but the exemplary embodiment is not limited thereto. The information processing program according to the present exemplary embodiment also may be provided to be recorded in a computer readable storage medium. For example, the information processing program according to the exemplary embodiment of the present invention may be provided by being recorded on an optical disc such as a compact disc (CD)-ROM, a digital versatile disc (DVD)-ROM, and the like or by being recorded in a semiconductor memory such as a universal serial bus (USB) memory, a memory card, and the like. In addition, the information processing program according to the present exemplary embodiment may be obtained from an external device via a communication line connected to the communication line I/F unit 48.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a collecting unit that collects data from communication devices;
   a receiving unit that receives a selection condition;
   a selecting unit that selects a piece of data from the collected data based on the selection condition received by the receiving unit;
   an output unit that outputs the selected piece of data to a subsequent processing unit;
   an image forming unit that forms an image on a recording medium;
   a setting unit that sets a keyword according to an operating state of the image forming unit, wherein the image forming unit is capable of forming an image and the operating state comprises an operating state of a printing function or an operating state of a scanning function; and
   a counting unit that counts the number of times the keyword appears in the collected data, wherein the selecting unit selects the piece of data based on the keyword and a synonym regarded as synonymous with the keyword set by the setting unit wherein a number of appearances based on the number of times the keyword appears in the collected data is equal to or larger than a predetermined threshold value, and wherein the number of times the synonym appears in the collected data is counted with the number of times the keyword appears in the collected data for the number of appearances, wherein the synonym comprises synonyms extracted from a synonym dictionary data stored in the storage unit, ordered according to a priority based on a number of appearances in the past, and are counted toward the number of times the keyword appears in the collected data for the number of appearances if exceeding a priority threshold.

2. The information processing apparatus according to claim 1,
   wherein the counting unit further counts the number of times an opposite keyword representing an opposite meaning of the keyword appears, and
   the selecting unit selects the piece of data based on the opposite keyword in a case where the opposite keyword appears more frequently than the keyword appears.

3. The information processing apparatus according to claim 1,
   wherein the communication devices respectively include audio input devices that input voices, and
   the collecting unit respectively collects pieces of audio data input to a plurality of the audio input devices.

4. The information processing apparatus according to claim 3,
   wherein the communication devices respectively include audio output devices that output audio data, and
   the information processing apparatus further comprises:
   an instruction unit that instructs the audio output devices to output audio data for notifying presence of the audio input devices.

5. A non-transitory computer readable medium storing an information processing program causing a computer to function as each of the units of the information processing apparatus comprising:
- a collecting unit that collects data from communication devices;
- a receiving unit that receives a selection condition;
- a selecting unit that selects a piece of data from the collected data based on the selection condition received by the receiving unit;
- an output unit that outputs the selected piece of data to a subsequent processing unit;
- an image forming unit that forms an image on a recording medium;
- a setting unit that sets a keyword according to an operating state of the image forming unit, wherein the image forming unit is capable of forming an image and the operating state comprises an operating state of a printing function or an operating state of a scanning function; and
- a counting unit that counts the number of times the keyword appears in the collected data, wherein the selecting unit selects the piece of data based on the keyword and a synonym regarded as synonymous with the keyword set by the setting unit wherein a number of appearances based on the number of times the keyword appears in the collected data is equal to or larger than a predetermined threshold value, and wherein the number of times the synonym appears in the collected data is counted with the number of times the keyword appears in the collected data for the number of appearances, wherein the synonym comprises synonyms extracted from a synonym dictionary data stored in the storage unit, ordered according to a priority based on a number of appearances in the past, and are counted toward the number of times the keyword appears in the collected data for the number of appearances if exceeding a priority threshold.

6. An information processing apparatus comprising:
- a collecting unit that collects data from communication devices;
- a receiving unit that receives a selection condition;
- a selecting unit that selects a piece of data from the collected data based on the selection condition received by the receiving unit;
- an output unit that outputs the selected piece of data to a subsequent processing unit;
- an image forming unit that forms an image on a recording medium;
- a setting unit that sets a keyword according to an operating state of the image forming unit, wherein the image forming unit is capable of forming an image and the operating state comprises an operating state of a printing function or an operating state of a scanning function; and
- a counting unit that counts the number of times the keyword appears in the collected data, wherein the selecting unit selects the piece of data based on the keyword and a synonym regarded as synonymous with the keyword set by the setting unit wherein a number of appearances based on the number of times the keyword appears in the collected data is equal to or larger than a predetermined threshold value, and wherein the number of times the synonym appears in the collected data is counted with the number of times the keyword appears in the collected data for the number of appearances, wherein the counting unit further counts the number of times an opposite keyword representing an opposite meaning of the keyword appears, and the selecting unit further selects the piece of data based on the opposite keyword in a case where the opposite keyword appears more frequently than the keyword appears.

* * * * *